Jan. 21, 1941.                G. H. FRASER                2,229,066

ROLLABLE BEARING

Filed Aug. 14, 1939

INVENTOR:
George Holt Fraser

Patented Jan. 21, 1941

2,229,066

UNITED STATES PATENT OFFICE 2,229,066

ROLLABLE BEARING

George Holt Fraser, Brooklyn, N. Y.

Application August 14, 1939, Serial No. 290,022

21 Claims. (Cl. 308—206)

This invention relates to anti-frictional rollable bearings of the type having an annular assembly of rollable members, and an annular retainer means therefor, both concentric of and movable around in and circumferentially through the space between a pair of annular race members, having concentric load stress sustaining races throughout the circumferential extent of which the peripheries of the rollable members contact with and roll between said races, and anti-frictionally rollably transmit said stress from one to another of said races, and concentrically position the latter, and aims to provide certain improvements therein.

Some such bearings have radial load stress sustaining races flanked by axial load stress sustaining races, and are provided with charging notches extended through the latter races and having bottoms flush with the former races, through which notches insertion of the rollable members into the space between the races is permitted.

Some such rollable members comprise an annular assembly of a plurality of spherical balls, and others an annular assembly of cylindrical rollers having outer peripheries transmitting radial stress, and end peripheries transmitting axial stress, between said races respectively.

The retainer means is usually an annular ring concentric of and between and movable circumferentially of said races, concentric of and movable with the rollable members, connected to the latter for retaining them, and having rigid spacer provisions extended between the adjacent peripheries of adjacent rollable members and spacing the latter circumferentially of said races as said peripheries revolve against said spacer provisions and thereby cause the retainer means to move concentrically with the rollable members and circumferentially of said races.

The frictional contact between the peripheries of the rollable members and said rigid spacer provisions varies with the stress required to overcome the resistance to circumferential movement of the retainer means, and such contact has tended to cause wear and heating in operation of the bearing, especially when such movement of the retainer means was resisted by intimate contact therewith of sealing means for resisting leakage from or toward the bearing.

Lubrication of the peripheries of the rollable members necessary for minimizing friction between them and the rigid spacer provisions has endangered over-lubrication of the bearing and tended to resist free rolling of the rollable members and has tended to cause lubricant to accumulate on the races and to gum the contactive peripheries and to cause heating of the bearing.

My invention aims in such a bearing to minimize the frictional resistance incident to effecting circumferential spacing of the circular assembly of rollable members by a concentric circular assembly of improved spacer means, and to facilitate progression of the retainer means circumferentially of the bearing, and to minimize or avoid lubrication of the peripheries of the load sustaining races and load transmission rollable members, and to facilitate lubrication of the bearing during and without stopping its operation, and to utilize the relative movement of the retainer means, relatively to the revoluble race of the bearing, for effecting lubrication of or recirculation of lubricant through the latter, and to improve the construction and operation of such bearings.

To this end I preferably provide, between the concentric races and the concentric circular assembly of rollable members of such a bearing, a concentric circular assembly of a plurality of improved rollable spacer members, rollable counter to said members and respectively in peripheral contact with adjacent peripheries of an adjacent pair of said rollable members, and rollably spacing the latter circumferentially of said races, which counterrollable members diametrically transmit spacing stress from one to the next of said rollable members, and are revolubly connected to said retainer means for antifrictionally positioning the latter relatively to and progressing the latter circumferentially with the assembly of rollable members in such manner that the retainer means may be so moved with minimum resistance to the operation of the bearing;

And I preferably revolubly radially sustain said counterrollable spacer members without molestation of said races or said rollable transmission members or said retainer means, in such manner that said parts may be operated without lubricant or dry under high temperatures;

And I preferably make said counterrollable spacer means adjustable relatively to said rollable members and to said races and to said sustainer means;

And I preferably provide improved lubricant means for the revoluble connection between said rollable parts and said retainer means, and leakage resistant partition means between said lubricant means and said contactive peripheries;

And I preferably provide arrestable lubricant charge means in communication and revoluble with said lubricant means and arrestable for charging the latter without stopping operation of the bearing;

And I preferably provide such a bearing with lubricant supply and return conduits, and with preferably endless lubricant circulation means, and with lubricant recirculation means operated by and in response to the relative movement of said retainer means and the revoluble one of said races, and effecting circulation of lubricant through the bearing coincidently with and in response to said relative movement;

And I preferably provide various other features of improvement, all of which will be more fully hereinafter referred to with reference to the accompanying drawing, in which—

Fig. 1 is a vertical axial section of a rollable bearing provided with the preferred form and combination of my present improvements, showing its stud shaft in side elevation and partly in vertical axial section and partly broken out to show the rollable members and counterrollable spacers of the bearing behind said shaft, the upper section being cut on the axis of one of the rollable members, and the lower part being cut on the axis of one of the counterrollable spacer means, said cuts being made respectively approximately on the planes of the lines 1—1 in Fig. 2 and looking in the direction of the arrows on said lines;

Figures 1, 2:
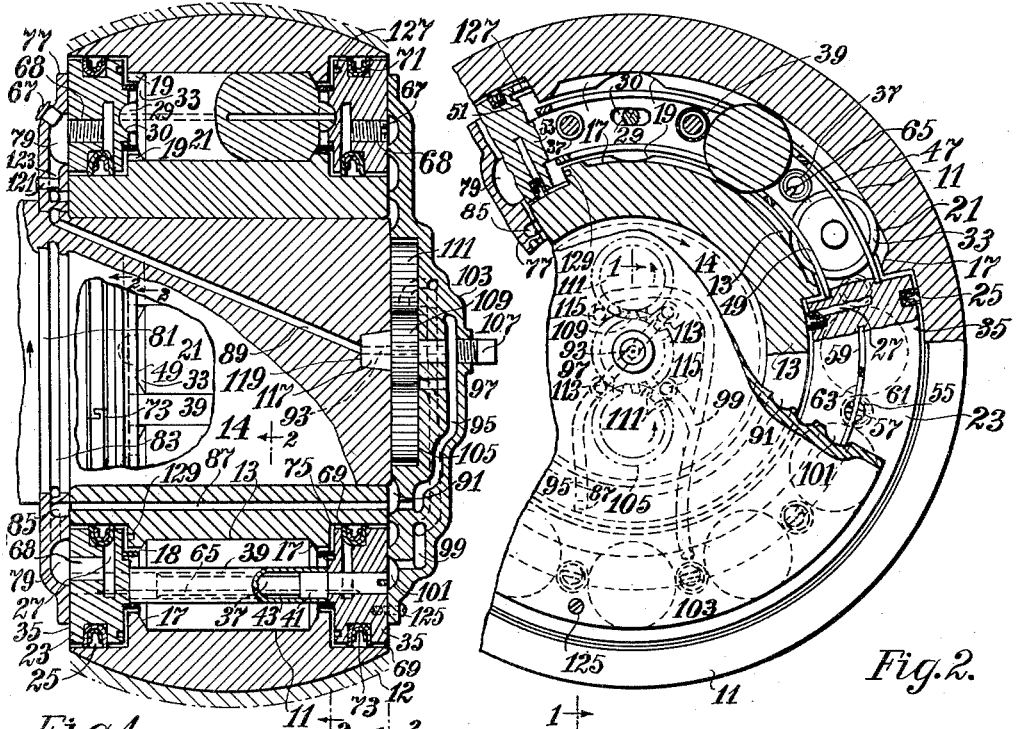
Fig. 2 is a fragmentary side elevation thereof, partly broken away and in vertical cross sections cut approximately on the lines 2—2 in Fig. 1 and looking in the direction of the arrows on said lines.

Referring to Figs. 1 and 2, which show the preferred utilization of my present improvements as applied to a horizontal axis, radial and axial stress resistant, anti-frictional roller bearing of the type in which concentric radial and axial load stress sustaining races are spaced by a concentric assembly of a plurality of load stress transmission members rollable circumferentially of and between said races, and positioned circumferentially thereof by annular retainer means concentric of and extended between said races and movable circumferentially relatively thereto with and in response to rolling of said members therebetween, let 11 indicate the outer race or member of said bearing, 12 its support, 13 its inner race or member, 14 its shaft, said races being opposed radially spaced concentric radial load stress resistant races on the members 11 and 13 respectively, 17 concentric axially spaced axial load stress resistant races or shoulders on the members 11 and 13 respectively, 19 the charging notches axially extended through the races 17, 21 the rollable radial and axial stress transmission members between said races, insertable therebetween through said notches, and rollable longitudinally of and anti-frictionally sustaining one of said races from the other thereof, which members 21 are spaced circumferentially of said races in the form of an annular assembly concentric of and movable around the latter, 23 annular retainer means concentric of and movable relatively to said races and revolubly connected to and movable with and retaining said rollable members between said races, and extended rigidly between and contactive with the adjacent peripheries of adjacent ones of said rollable members for spacing the latter circumferentially of said races, 25 sealing means between said races and said retainer means and revoluble with the latter for resisting leakage therebetween, and 27 lubricant means for said retainer means.

These may be any usual or suitable parts for anti-frictional rollable bearings having concentric annular races spaced by a concentric assembly of rollable members which are retained concentrically of and spaced circumferentially of said races by concentric retainers.

In such bearings either race may be rotary and the retainer means moves with it at half the speed of the rotary race as the rollable members roll on the other race. The rollable members may be balls or rollers, and the races may be radially or axially stress resistant, and may be rigidly or oscillatorily mounted in any axial position, or constructed to rock and compensate for mis-alignment.

As shown the outer member 11 is non-rotary in its support 12, and the inner member 13 is fixed on the end of and revolves with its shaft 14, which is shown as revolving in clockwise direction.

The radial stress sustaining races of the inner and outer members are shown as annular cylindrical faces, and the axial stress sustaining races 17 are shown as disposed at and radially projected from the sides of the radial races, and as axially spaced opposed chamfered beveled or inclined axial stress resistant races or faces, and as radially spaced from each other to sufficiently afford an annular retainer clearance space 18 between them, and as having opposed charging notches 19 the bottoms of which respectively coincide with the peripheries of the radial races for permitting entry of the rollable members between the races.

The rollable stress transmission means is shown as an annular assembly of rollable members 21 circumferentially spaced between and concentrically of and movable circumferentially of said races, and as comprising a plurality of rollers 21 having radial stress transmission peripheries rollably fitting and radially transmitting radial load stress between the radial races, and having chamfered beveled or inclined end axial stress transmission faces 33 of similar contour to and rollably fitting between and engaging the races 17 and rollably transmitting axial stress between the latter.

The retainer means 23 is shown as an annular cage or assembly concentric of and extended axially between and revoluble circumferentially of and relatively to said races, and movable with and revolubly connected to said rollable members, and revolubly retaining the latter radially of said races.

The sealing means 25 is shown as a plurality of annular packing rings between and resisting leakage between the inner and outer members and their retainer means, and the lubricating means 27 is shown as lubricant ducts or conduits carried by and revoluble with and communicating through the retainer means.

The retainer means is shown as a rigid circular assembly comprising axially spaced rings 35 concentric with and at the sides of the radial races and axially spaced and connected by rigid shafts, studs or pins 37, intermediate of and disposed concentrically of the radial races, and circumferentially spaced relatively thereto and extended axially through and movable in the space 18 therebetween, which pins respectively are disposed intermediate of the adjacent peripheries of adjacent ones of said rollable members and afford between said pins apertures in which said rolls are rollably retained between said races.

As shown the rollable members 21 are spaced circumferentially of and radially retained by and radially position the retainer means 23 by being revolubly connected to the latter, as by having hemi-spherical bearing ends 29 revolubly fitting in bearings 30 in the opposed inner faces of the rings 35, which ends 29 are preferably reduced to as small a diameter as will suffice to radially position the rolls 21 and rings 35 with a minimum of frictional running contact between these parts as the rollable members maintain the rings concentric of and out of peripheral contact with the peripheries of the members 11 and 13, for minimizing frictional running contact between the members and the retainer means.

In some such bearings the rollable members 21 have been spaced circumferentially of the races by spacer provisions carried by the retainer means and extended rigidly between and in running contact with adjacent peripheries of adjacent rollable members, a construction involving some frictional resistance to free rollability of the latter, and tending to heat the bearing especially when lubricant of considerable viscosity reached the peripheries of the rollable members.

Other such bearings, to reduce such frictional resistance, provide a concentric annular assembly of rollable spacer means between and in fixed predetermined relation to and in rollable contact with the adjacent peripheries of the rollable members, revolved by contact with said peripheries and revoluble counter to and circumferentially spacing the rollable members.

This has been accomplished by providing the retainer means 23 with a counterrollable spacer means 39 between each pair of rollable members 21, revolubly connected to the retainer means and diametrically resisting, and transmitting circumferentially of the latter, tendency of the rollable members to approach one another or to wind or mis-align.

As shown, each spacer means 39 is a tubular cylinder revolubly connected to the rings 35 by being mounted with a loose running connection on the adjacent pin 37 in such manner that wind of the tube will be resisted and the rings will be progressed circumferentially of the races as the rollable members roll between the latter, which will diametrically sustain the stress of circumferentially spacing the rollable members relatively to the races and retainer means.

As shown the pins 37 have shoulder bearing ends 41 axially spacing the rings 35 and revolubly carrying the tubes 39 near the ends of the rollers 21, and a reduced intermediate centre or clearance portion affording an oil chamber or conduit 43 internally of the spacer carried on the pin.

In this manner the spacer means have been positioned in radially fixed predetermined operative relation to the race means and rollable members and the retainer means and circumferentially of and concentrically of and in parallelism with the axis of the retainer means as the pins 37 rigidly positioned the rings 35 concentrically of the races, and the spacer means rolled on the pins with minimized frictional contact therewith as they progressed the rings circumferentially of the races, such contact merely having to overcome the resistance to such progression when the axis of a pin coincides approximately with a direct line between the axes of adjacent rollable members or is near enough to such coincidence to minimize any radial stress on the spacer tube.

In such constructions the rollable members 21 have been circumferentially movable relatively to the rings 35 for relieving the revoluble connection between these of any stress incident to circumferential movement of the retainer means, and this I preferably accomplish by making the bearings 30 as a circumferentially extended groove or a series of circumferentially spaced bearing sockets in and extended circumferentially of the inner side of each ring 35, and of such cross sectional shape that it will revolubly embrace the adjacent projection 29 of a roll 21 and radially position and sustain the ring 35 therefrom, but will afford a clearance, at each side of said projection, circumferentially of said ring so that the roll may freely position itself relatively to the spacer means 39 at each side of it and act through said spacer means to revolve the retainer means without transmitting the stress required for such revolution to the revoluble connection between the roll and the rings 35. In this manner the frictional revoluble connections radially sustain the rings without being subjected to the stress of their circumferential movement, which is sustained and transmitted to the rings by the rollable spacers 39 loosely revoluble on the shoulders 41 of the pins 37, the outer ends 45 of which pins are respectively mounted in the rings 35 and cause the latter to revolve at half the speed of the revoluble race as the rolls revolve between it and the other race.

Generally such a bearing preferably provides means for anti-frictionally revolubly sustaining the rollable spacer means against stress radially of the races which may be incident to location of their axes inwardly or outwardly of the direct line between the axes of an adjacent pair of rolls, preferably as shown by providing concentrically of the circular assembly of rollable spacer means and in operative relation to their adjacent peripheries one or more annular sustainer means revoluble relatively to and revolubly connected to the retainer means and in peripheral contact with and revolved by the spacer means and revolubly sustaining the latter against stress radially of the races, the extent of which stress varies with the position of the axis of the spacer means relative to the axes of the adjacent rollers, and the direction of which stress is outwardly when the axes of the spacer means are shown as disposed outwardly of said line, and is inwardly when said axis is disposed inwardly of said line.

For sustaining said outward stress outer sustainer rings 47 have been provided in radially fixed relation to the retainer means and around and outwardly sustaining the circular assembly of circumferentially spaced spacer means which are shown as disposed outwardly of said axes and in peripheral contact with and rollably sustained by the inner periphery of the ring 47. For sustaining such inner stress inner sustainer rings 49 in radially fixed relation to the retainer means have been provided, carried by and revolubly connected to and revoluble relatively to the retainer means, and having outer peripheries spaced concentrically inwardly of said outer ring sufficiently to rollably contact the inner peripheries of said spacer members and thereby to revolubly sustain them against any inward stress they may exert radially toward said inner ring. The stresses sustained by the rings 47 and 49 are relatively minor, which permits these rings to be of light construction and cross section, and they are usually mounted in the clearance spaces 18 between the axially resistant races 17 and between the axial transmission faces of the rollable members and the inner wall 51 of each ring 35 and revolubly connected to and radially positioned relatively to the latter by an annular bearing projection extended therefrom inwardly between them in such manner that they clear the spherical ends 29 of the rollers 21, which ends are of less diameter than the rollable spacers. Thus the sustainer rings 49 and 47 afford between them clearance for revolution of the rollable members 21 and the counterrollable spacer tubes 39.

When the inner race 13 revolves clockwise as shown the rollable members 21 will revolve counterclockwise as they roll clockwise in the outer race 11 and will revolve the spacer means clockwise in such manner that as the outer peripheries of the tubes 39 engage the inner periphery of the outer ring 47 this will be revolved relatively to and in the same direction as the race 13, and as the inner peripheries of the spacer tubes engage the outer periphery of the inner sustainer ring 49 the latter will be revolved relatively to and counter to the revolution of the race 13, and in either case the sustainer rings 47 and 49 will revolve relatively to the retainer means 23.

When used to revolubly sustain the entire stress of the spacer tubes radially of the races the clearance between the revoluble connections between the spacer tubes and the retainer means is preferably sufficient to permit the spacer tubes to exert all such stress against the sustainer means, to the end that the frictional load between the spacer tubes and the pins 37 may be reduced to only that necessary to circumferentially progress the retainer means.

According to one feature of improvement my invention preferably provides adjustable or shiftable spacer means, preferably relatively adjustable and adjustable or shiftable radially of or relatively to the race means and circumferentially and radially of the retainer means and radially or circumferentially relatively to the rollable members 21, in such manner that clearance between the latter may be varied and wear thereof may be compensated for, and stress of the rollable spacer tubes radially of the retainer means may be varied or adjusted or shifted from an outer to an inner direction or from toward the outer sustainer ring 47 to toward the inner sustainer ring 49, and this I preferably accomplish by adjustably connecting the spacer means eccentrically of their axes to the retainer means, preferably as shown by making the ends 45 of the pins 37 eccentric of the bearing portions 41 of the latter, and by mounting them circumferentially movably in holes 55 in the rings 35, and providing them with means for turning them, as notches 57 by which with a screw driver the pin may be turned to shift the axis of the spacer tube on it from the outer position shown, more or less toward an inner position to vary its relation to the adjacent pair of rollable members 21, or to one or the other of the sustainer rings 47 or 49.

In this manner the spacer members 39 may be so revolubly poised or positioned between the adjacent peripheries of a pair of rolls and a sustainer ring that these parts may revolve without frictional running contacts between them and without causing heating or requiring lubrication, thus permitting their use in a dry or unlubricated anti-frictional rollable bearing, or in one which is operated under temperatures exceeding those at which lubricant can be used, so that the bearing may be immune to temperature variations and heat proof during its operation.

According to another feature of improvement my invention preferably provides locking means for locking or fixedly holding the adjustable spacer means in an adjusted position thereof, for accomplishing which the adjustment means or notches 57 for turning the pins 37 are preferably multiplied (two at right angles being shown) to coincide with predetermined desired positions for the spacer tubes 39, and are shown as movable into coincidence with a groove 59 in the outer wall 61 of the adjacent ring 35, and as non-rotatively engaged by a lock ring 63 removably seated in said groove and thereby holding the pin and the spacer rollably carried by it against movement from their adjusted positions.

According to another feature of improvement my invention provides alternatively operable outer and inner sustainer means 47 and 49 having opposed peripheries radially spaced a distance exceeding the diameters of the spacer means 39 between them to such extent that the latter may be radially adjusted between them from an outer position in which its periphery engages and is sustained against outward stress by the inner periphery of the outer sustainer 47 to an inner position in which the periphery of the spacer means engages and is sustained against inward stress by the outer periphery of the inner sustainer 49 whereby adjustment of the spacer members between the sustainer means is permitted and the sustainer means respectively alternatively sustain the spacer means when the latter are in their extreme outer or inner positions.

According to another feature of improvement my invention preferably provides simultaneous lubricating means common to and collectively lubricating a circumferentially spaced plurality of revoluble connections between the annular retainer means 23 and those of the rollable revoluble connections which it is desired to lubricate, which in the construction shown are only the revoluble connections between the inner periphery of each rollable spacer member 39 and its bearing on its pin 37, and this I preferably accomplish by providing an annular lubricating means or chamber 27 within and radially outwardly extended within each ring 35 and in communication with and simultaneously collectively supplying lubricant to a circumferentially spaced plurality of rollable spacer bearings 41, for affording which communication each pin is shown as provided with a lubricant supply conduit or duct 65 extended from the chamber 27 through the bearing 41 and into the lubricant chamber 43 encircled and enclosed by the spacer 39 carried by said bearing in such manner that lubricant from the chamber 27 may flow into the interior of and through each spacer tube 39 and internally lubricate both ends thereof and preferably may flow from one chamber 27 in one ring 35 into the other chamber 27 in the other ring 35 and thereby circulate intermediate of the rollable members and through the spacer members from one to another of the bearings for the latter and equalize lubricant for circumferentially spaced successive ones of said bearings. As shown each chamber 27 is preferably cut in the inner periphery of its ring 35 in such manner that rotation of this ring will tend to centrifugally urge lubricant outwardly to and into the bearings 41, and one or more of the chambers 27 is provided with a conventional check valve 67, shown as reversibly screwed into its ring 35, through one of which check valves lubricant may be entered into the chamber 27 and through the other of which check valves it may be withdrawn therefrom when such manipulation is desired, for permitting which the outer side wall of each ring 35 is preferably formed with an axially extended opening 68 communicating from its chamber 27 axially to externally of the ring 35.

According to another feature of improvement I provide radially yieldably active annular peripheral sealing means 25 mounted in the grooves 71 in the edges of and carried by and revoluble with and extended circumferentially of the inner and outer peripheries of a retainer ring 35 and extended radially from said peripheries to beyond the bottoms of the charging notches 19, and enclosed by and in revoluble leakage resistant contact with the members 11 and 13 beyond said bottoms, as shown by forming said members with opposed circumferentially extended female recesses 69, in which the rings 35 are loosely enclosed and freely revoluble with said sealing means in running contact with and protected by the opposed peripheries of said recesses, axially of which they are shown as leakage resistant in inward and outward directions, for resisting outward leakage through the notches 19 and inward leakage to the latter. The sealing means are shown as flexible rings of U-shaped cross section mounted in grooves 71 in the inner and outer peripheries of the rings 35 and removably held in said grooves by removable annular clamps 73, the outer groove 71 being formed in an imperforate outer portion of its ring 35, and the inner groove 71 being extended into the inner periphery and into communication with the lubricant chamber 27, the inner side of which is closed by the sealing means seated in said inner groove in such manner as to make the oil chamber 27 a substantially closed annular chamber internally of and extended circumferentially within its ring 35, and closed by and in communication with the adjacent periphery of its sealing means 25, by which pressure of lubricant forced into the chamber 27 is sustained in such manner that escape of lubricant inwardly from the chamber 27 is resisted by the adjacent sealing means 25. In this construction the radial width of each ring materially exceeds the radial distance between the races sufficiently to materially overlap the bottoms of the notches 19 and to dispose the sealing means 25 sufficiently beyond said bottoms to effectively resist leakage therefrom or thereto.

According to another feature of improvement my invention preferably provides lubricant partition means between and for isolating the load sustaining races and the load transmission peripheries of the rollable members 21 from the lubricant chamber 27 and the lubricant used for the revoluble connections between the revoluble spacer means 39 and the rings 35, to the end that access of said lubricant to said races and peripheries may be prevented and they may be operated dry without lubricant, for accomplishing which I preferably partition said lubricating means from said races and peripheries by making each ring 35 with a closed inner wall or partition 75 at the inner side of its lubricant chamber 27, and by enclosing each lubricant duct 65 and lubricant chamber 43 within the interior of the spacer member revolubly mounted around it, in such manner that lubricant for the latter will be confined within the chambers 27 and 43 and passage of such lubricant to the outer peripheries of such members and of the rollable members and to such races will be resisted and the spacer members may be internally lubricated without lubricating their outer peripheries.

To obviate stoppage of revolution of the retainer means 23 for supplying lubricant through its opening 68, according to another feature my invention preferably provides revolubly arrestable lubricant supply means for supplying such lubricant during and without stopping revolution of the retainer means, preferably as shown by providing a non-rotary annular lubricant charge means 77 shown as a ring having an annular chamber 79 at the outer side of and concentric with one of the retainer rings 35 and in communication with its side openings 68, and with a check valve 67 through which lubricant may be supplied to the chamber 79, from which it may pass through an opening 68 to the lubricating means 27 while the retainer means 23 is revolving during operation of the bearing.

Preferably the charging chamber 79 is an annular groove in and open at one side of the lubricant supply ring 77, said side of which is in leakage resistant contact with and in revoluble operative relation to the outer side wall of the adjacent retainer ring 35, in such manner that the ring 77 may revolve with or relatively to the ring 35 and is so revolubly connected to the latter that its rotation therewith may be arrested so that it may be non-rotary relatively thereto and to the other parts of the bearing while its chamber 79 is being charged with lubricant during operation of the bearing.

Preferably the ring 77 is in leak resistant contactive engagement with and revoluble relatively to the adjacent end of the inner member 13 and is positioned and revolubly connected to the latter and to the adjacent ring 35 by being revolubly mounted on a shoulder bearing 81 on the shaft 14, which bearing has a peripheral groove 83 in communication with an internal chamber 85 opening through the inner periphery of the ring 77 and in communication with the chamber 79 for conducting lubricant from the latter to the bearing 81. This construction permits arrest of rotation of the ring 77 while charging its chamber 79, and at other times permits said ring to revolve with or relatively to the retainer means and the member 13.

According to another feature of improvement my invention preferably provides an anti-frictional rollable bearing with endless fluid supply and return circulation means and with fluid recirculation means for the recirculation of lubricant or other cooling medium or fluid in it, for effecting flow of such fluid circumferentially of its retainer means and axially intermediate its races and returning such fluid axially of the latter in an endless circuit during operation of the bearing, and this I preferably accomplish by providing the bearing with an endless lubricant conduit system comprising one or more lubricant return ducts, as 87, extended axially through the inner member 13, and 89 extended axially and diagonally through and from the periphery of to the centre of the shaft 14, each of which is shown in communication at one side of the bearing with the inner lubricant chamber 85 of the ring 77, for receiving and axially returning lubricant therefrom to the other side of the bearing, where the duct 87 is shown as in communication with an annular return collection chamber 91, and the duct 89 as in communication with a central return duct 93, the chamber 91 and duct 93 being connected by a suction duct 95 common to both and to the ingress sides of a fluid circulation means 97, the egress sides of which are shown as connected by a discharge duct 99, common to both, with an annular lubricant discharge chamber 101 concentric of and revoluble with the retainer means 23 and removably attached, as by screws 125, to the outer side wall of the other ring 35 at the side thereof remote to the ring 77 and in communication with and discharging returned lubricant through the holes 68 into the lubricant chamber 27 of said ring.

As shown the collection chamber 91 and discharge chamber 101 are concentric annular grooves formed and opening through the side of a casting member 103 fitted against the outer side of and revoluble with the adjacent retainer ring 35 and fitted against and revoluble relatively to and making a leakage resistant engagement in contact with the adjacent end of the inner member 13 and the shaft 14, the inner side of which casting is provided with a chamber 105 in revoluble leakage resistant contact with the end of the shaft 14 and enclosing the circulation means 97, and the central duct 93 extends axially through this casting to and in communication with the suction duct 95 which is formed in an outer portion of the casting 103 and extends from the collection chamber 91 to and beyond the duct 93 and into communication with the latter and with the ingress ports of the circulation means 97, and the discharge duct 99 is formed within the outer portion of the casting 103 and extends from the egress ports of the circulation means 97 to and into communication with the discharge chamber 101, these ducts being arranged in such manner that lubricant returning through the ports 87 and 89 will be sucked through the conduits 93 and 95 into the ingress ports of the circulation means and will be forced from the egress ports of the latter through the discharge conduit 97 into the discharge chamber 101, from which it will be forced through the opening 68 in the adjacent ring 35 into the lubricant chamber 27 of the latter, from which it will be forced through the duct 65 and lubricant chambers 43 into the lubricant chamber of the other ring 35, from which it will outflow into the chamber 79, from which it will pass through the chamber 85 to and return through the ducts 87 and 89, in such manner that it outflows and returns in an endless path into which lubricant may be supplied during operation through the check valve 67 for the chamber 79, or by pressure when revolution is terminated through a force feed check valve 107.

Any suitable means for effecting circulation of lubricant in or through the bearing, or withdrawing it therefrom or returning it thereto, may be employed, but according to another feature of my invention I preferably provide a rollable member bearing with fluid feeder or circulation or recirculation means in operative relation to and operated by revolution of the revoluble race member or the revoluble retainer means, and preferably with differential revolution utilization operating means for operating said circulation means, operable to utilize the differential revolution of the retainer means 23 relatively to the revoluble one of the members 11 and 13 for operating the circulation means and effecting such circulation coincidently with and in response to operation of the bearing, for accomplishing which I preferably make the circulation means with any usual counter revoluble pumping members, such as intermeshing gear wheels, and dispose one of these, as a gear 109, concentrically of and revolve it with revolution of the inner member 13 and its shaft 14, and the other as one or more planetary gears 111 eccentric of and revoluble around and meshed with the gear 109 and revolved around it by and revolubly carried by the casting 103, in such manner that rotation of the gear 109 clockwise with and at the speed of the shaft 14 will cause the gears 111 to rotate on and counter to the gear 109 as they are revolved by clockwise revolution of the casting 103 at half the speed of revolution of the shaft 14.

Preferably as shown the chamber 105 is shaped to receive and make a close revoluble fit with the peripheries of the teeth of the gears 109 and 111, and is formed with suction ports 113 at their sides where their teeth disengage and with discharge ports 115 at their sides where their teeth intermesh, the suction ports being in communication with the suction duct 95, and the discharge ports being in communication with the duct 99, in such manner that as the gear 109 revolves twice as fast as the casting 103 it will cause the gears 111 to revolve counter to the gear 109 as they are more slowly revolved around it coincidently with revolution of the retainer means 23, and fluid is circulated around the gears from their suction to their discharge ports, and forced through the discharge conduit 99. In this manner such circulation will be continuous during and coincident with and in response to operation of the bearing.

As shown the sides of the gears 109 and 111 fit revolubly between the adjacent walls of the shaft 14 and casting 103 with sufficient intimacy to resist leakage at their sides, and the gear 109 is tubular and affords a complementary part of the central conduit 93, and has a tapered or squared projection 117 fitted in and frictionally removably connecting it within a socket 119 in the outer end of and keying it to the shaft 14 in such manner that it can be applied to and removed from and will be rotated by said shaft. The gears are preferably carried by and removable with the casting 103, which is preferably removably bolted to the adjacent ring 35 and can be removed therefrom when automatic circulation of lubricant is not desired, in which case in the construction shown return flow of lubricant from the chamber 79 is prevented by closing communication therefrom to the chamber 85 by closing stop valves 121 in the ducts 123 communicating between said chambers.

For cooling lubricant during its return and before recirculating it the suction duct 95 and the discharge duct 99 are preferably disposed in an outer part and adjacent the outer side wall of the casting 103 in order that heat from the fluid flowing through said ducts may be radiated through the thin outer wall of said casting for more or less cooling the lubricant before it is returned to the retainer means.

As shown each ring 35 has a circumferentially extended annular groove 127 cut in its inner wall and disposed outwardly of the bottom of the adjacent charging notch and opposite the adjacent side wall of the outer member 11, in which groove lubricant may accumulate for resisting leakage past it, and the inner member 13 is formed with an annular groove 129 extended circumferentially in its side and disposed radially inwardly of the bottom of its charging notch and opposite and adjacent the inner wall of the adjacent ring 35, for accumulating lubricant in said groove and affording a leakage resistant means between it and said wall beyond the bottom of said notch, which grooves when used in conjunction with the sealing means 25 supplement and are complementary to the latter without materially resisting revolution of the retainer means.

Figure 3:
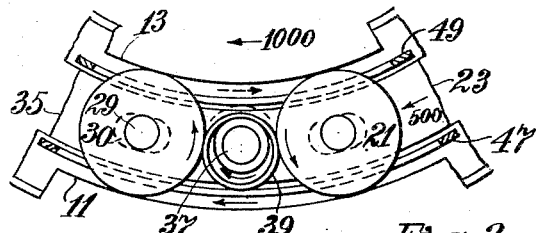
Fig. 3 is a fragmentary diagrammatic view on an enlarged scale showing in end elevation my counterrollable spacer means in operative relation to a pair of rollable members and their retainer means, and radially sustained by one of my revoluble sustainer means, all between and movable relatively to outer and inner race means.
Figure 4:
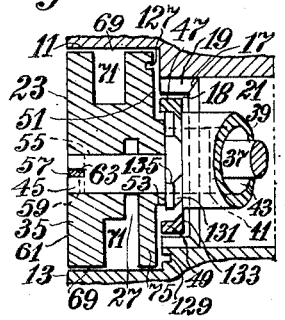
Fig. 4 is a fragmentary enlarged side elevation of one of the counterrollable spacer means, and a vertical cross section of its adjacent retainer ring and sustainer rings.

In operation with the preferred form of my invention shown in Figs. 1, 2 and 3, an annular assembly of rollable spacer means will revolve on the spacer shafts of the retainer means and cause the latter to be revolved from the rollable members in such manner that the resistance of the retainer means to such rotation will be the only stress on the revoluble connections between the spacer means and the retainer means, and frictional resistance to rolling of the rollable members and counter-rolling of the spacer means will be minimized to that incident to overcoming such stress and positioning the retainer means concentrically of and circumferentially relatively to the races when return and recirculation of lubricant or other fluid is not employed, and plus the stress required for effecting such return and recirculation when the latter is desired. Stress of the rollable spacer means radially of the retainer means will be revolubly sustained by the outer sustainer rings 47 when the spacer tubes are adjusted against these rings, or by the inner spacer rings 49 when the spacer tubes are adjusted against these rings, or by the spacer pins 37 when the spacer tubes are adjusted to any position intermediate these rings, in which intermediate positions radial stress on the spacer tubes will be so slight as to add little to the frictional resistance incident to their revoluble connections with said pins.

Assuming that as indicated in Fig. 3 the peripheral speed of the inner race is at the rate of 1000 feet per minute in the direction of the arrow 1000, the peripheral speeds of the rollable members 21, the spacer tubes 39, and the outer ring 47, would each be in the direction of the arrows shown thereon at the rate of 1000 feet per minute, and the speed of revolution of the retainer means in the direction of the arrow 500 shown thereon would be at the rate of 500 feet per minute, as it would move with the axes of the rollable members 21, movement of which axes as the rollable members roll on the stationary race would be half of the movement of the revolving race.

In such case the outer ring 47 would revolve in the same direction as and at twice the peripheral speed of revolution of the ring 35. If the spacer tubes 39 were adjusted to the inner position shown in dotted lines in Fig. 3 their radial stress would be sustained by the inner sustainer ring 49, which would be revolved by them counter to the direction of revolution of the ring 35 and at a peripheral speed of 1000 feet. Should the spacer tubes 39 be adjusted to any position intermediate of said positions the sustainer rings 47 and 49 would be out of revoluble engagement with the peripheries of the spacer tubes and free relatively to them and the rollable members and the retainer means by reason of their loose revoluble connection with the latter and said races. Before operation, one of the lubricating means 27 will be charged with lubricant through one of the openings 68, which lubricant will be distributed to and flow into and fill the tubes 39 and from them and into and be collected in the other lubricating chamber 27. During operation lubricant in said chambers will be centrifugally distributed between and urged toward the bearings 41. For replenishing lubricant during operation, rotation, of the revolubly connected supply ring 77 will be arrested and while it is non-rotary lubricant will be added through its check valve 67, after which the ring may resume revolution with the retainer means until again arrested for adding lubricant without stopping operation.

When continuous circulation of lubricant is desired the stop valve 121 will be open to afford communication through the duct 123 between the charging chamber 79 and the return chamber 85, from which lubricant will flow through the duct 87 to the collection chamber 91 and through the suction duct 95 to the suction ports of the recirculating means 97, and through the duct 89 and the central duct 93, and through this to the circulating means, from the discharge ports of which it will flow through the discharge duct 99 to the discharge chamber 101 from which it will be returned to the adjacent lubricating means 27 in such manner as to effect a continuous fluid flow and return of lubricant in an endless circuit through and around the bearing during and in response to and synchronously with operation of the latter, after such ducts and chambers have been filled with lubricant by forcing the latter into them through the pressure feed check valve 107.

When the difference in speed of revolution between the retainer means and the revoluble race is utilized for operating the circulation means in the construction shown, when the driving gear 109 is revolved at twice the speed at which the driven gears 111 are revolved around it the driven gears in mesh with it will rotate counter to it in such manner that lubricant will be sucked between the disengaging teeth, carried around between the teeth, and discharged from between the interengaging teeth, the dimensions of which will be suited to the volume and velocity desired for the pumping action.

When the gears are narrow for conserving axial dimensions as shown the number of the planetary gears will be multiplied as desired for multiplying the pumping action and centrifugally balancing the circulation means, and when recirculation is not desired the stop valve 121 may be closed and the casting 103 removed for using the bearing in normal operation.

It will be understood that my invention is not limited to the particular details of construction, arrangement or combination of features set forth and shown as the preferred form and utilization of my present improvements, since my improvements can be availed of in whole or in part according to such modifications of these, as circumstances, or the judgment of those skilled in the art, may dictate, without departing from the spirit of the invention.

Preferably for axially positioning the sustainer rings 47 and 49 out of axial contact with the retainer means and the rollable members and in predetermined axial relation to the spacer means, each of the latter is formed with a peripheral groove 131, and each sustainer ring is formed with a peripheral track 133 in position to be engaged and axially restrained by said groove, and said grooves and tracks are formed with one or more charging notches 135 through which they may be assembled and interengaged.

Figure 6:
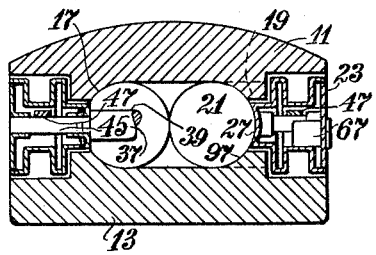
Fig. 6 is a fragmentary vertical axial section of ball bearing races provided with modified forms of my improvements.
Figure 5:
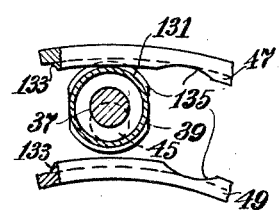
Fig. 5 is an enlarged fragmentary cross section of one of the counterrollable spacer means between its sustainer rings and radially sustained by one of the latter.

With cylindrical rollable members 21 and radially adjustable spacer means 39 I prefer to use outer and inner sustainer rings 47 and 49, and to dispose these rings in the oilless space 18 between the ends of the rollable members and the adjacent inner wall or partition of the respective retainer rings 35, but according to one modification of my improvements, for conserving axial dimensions when the rollable members are spheres or balls, as shown in Fig. 6, I prefer to use only outer sustainer rings 47, and to dispose these respectively outwardly of said inner walls and within the hollow interior or lubricant chamber 27 of each ring, and in peripheral contact with and anti-frictionally revolubly sustaining the adjacent end of the stud 37, in such manner that the stud itself is revoluble in its retainer rings 35, and itself constitutes the revoluble spacer means, for which purpose it preferably has an enlarged central periphery 39 between and in contact with the adjacent peripheries of an adjacent pair of rollable members by and counter to which it is revolved as its radial stress is resisted by the sustainer rings 47, as shown in Fig. 6.

In this construction the rings 35 are shown as annularly grooved pressed metal rings each having an internal lubricant chamber 27 closed by a removable outer wall 61.

Figure 7:
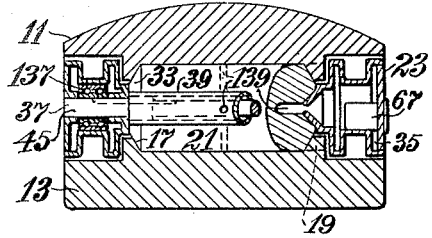
Fig. 7 is a fragmentary vertical axial section of roller bearing races provided with modified forms of my improvements.

According to another modification, when desired each stud 37 may itself constitute the counter rollable spacer means between the rollable members 21, in which case its ends are preferably respectively anti-frictionally revolubly connected to the adjacent rings 35 by being mounted in ball bearings 137 mounted in the lubricant chamber 27, on the principle shown in Fig. 7 for example, in such manner that the spacers will be radially positioned by and will radially position the rings circumferentially with minimum frictional resistance to the counter rollability of the spacers. In this construction the spacers and rollable members are shown as having axially and radially extended lubricant ducts 139 in communication with the lubricant chambers 27 in the retainer rings 35, for conducting lubricant from said chambers axially of and to the peripheries of the spacers and rollable members and the adjacent races, for lubricating these instead of operating them without lubricant as before described.

Figure 9:
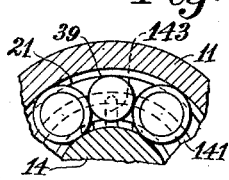
Fig. 9 is a fragmentary cross section thereof cut approximately on the lines 9—9 in Fig. 8 and looking in the direction of the arrow on said line.
Figure 8:
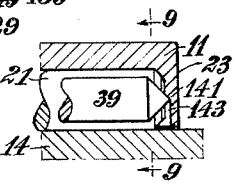
Fig. 8 is a fragmentary vertical axial section of a needle roller bearing provided with modified forms of my improvements.

When my improvements are availed of with anti-frictional bearings of the needle roller type, such as shown in Figs. 8 and 9, in which for compactness the shaft itself may serve as the inner race and the outer race 11 carries and retains the rollable members 21, my counter rollable spacers 39 are of less diameter than the rollable members 21 and are radially positioned between and in peripheral contact with the adjacent peripheries of adjacent pairs of the latter by having their ends movably and revolubly mounted in an annular groove 141 extended circumferentially and centrally of the usual retainer groove 23 for the rollable members 21, in such manner that the spacer means may move with and revolve counter to the rollable members without molestation from the peripheries of the adjacent races, from which its periphery is maintained in spaced relation by its sustainer groove 141, into which it may be entered by a charging notch 143 provided for entry of the members 21, which I make deep enough to intersect the sustainer groove 141 and permit entry of the end of the spacer 39.

In such a utilization the rollable members 21 and the counter rollable spacer means 39 both move circumferentially of the retainer means 23, which as shown is in fixed relation to the race 11 and comprises a shallow internal circumferential groove fitting and traversed by the ends of the rollable members 21, and a deeper internal circumferential groove 141 fitting and traversed circumferentially by the ends of the counter rollable spacers, which ends project axially beyond the ends of the rollable members and are radially sustained in juxta position to the latter by the groove 141, which in such case is a non-rotary sustainer means rollably sustaining the spacer means.

What I claim is:

1. In an anti-frictional bearing comprising, annular race means, an annular assembly concentric therewith of a plurality of load transmission rollable members respectively having outer peripheries in rollable operative relation to said means, and retainer means retaining said rollable members; the combination therewith of an annular assembly of a plurality of adjustable counterrollable spacer members, respectively having external peripheries in peripheral contact with the adjacent outer peripheries of and spacing adjacent pairs of said rollable members circumferentially of said means, counter revolved by said rollable members, adjustable relatively to said means, and movable concentrically of and revoluble relatively to said means, and means for adjusting said spacer means.

2. The anti-frictional bearing specified in claim 1, having said counterrollable spacer members adjustable radially of said means.

3. The anti-frictional bearing specified in claim 1, having said counterrollable spacer members adjustable relatively to said rollable members.

4. The anti-frictional bearing specified in claim 1, having said counterrollable spacer members adjustable circumferentially of said rollable members.

5. The anti-frictional bearing specified in claim 1, having said counterrollable spacer members relatively adjustable.

6. In an anti-frictional bearing comprising, annular race means sustaining load stress, an annular assembly of a plurality of load transmission rollable members respectively having outer peripheries in rollable operative relation to said means, an annular assembly of a plurality of radially shiftable counterrollable spacer members, respectively having external peripheries in peripheral contact with the adjacent outer peripheries of and spacing adjacent pairs of said rollable members circumferentially of said means, radially shiftable inwardly and outwardly of said assembly of rollable members, and movable concentrically of and revoluble relatively to said means, and radially spaced inner and outer alternative annular sustainer means, concentric of and movable concentrically and circumferentially of said annular assembly of counterrollable spacer members and alternatively positioning and radially sustaining the latter relatively to said rollable members, in revoluble operative relation to and revolved by and revolubly sustaining said counterrollable spacer members, and movable concentrically of and revoluble relatively to said means during said sustenance, and means for radially shifting said spacer members into alternative operative relation to said sustainer means respectively.

7. The bearing specified in claim 6, having said counterrollable spacer members and said sustainer means having interengageable reciprocal provisions for axially positioning said sustainer means having charging notches for interengagement thereof.

8. The bearing specified in claim 1, having said counterrollable spacer members adjustably fixable and having means for fixing said spacer means in an adjusted position.

9. The bearing specified in claim 1, having said counterrollable spacer members connected eccentrically of their axes to said retainer means.

10. In an anti-frictional bearing comprising, concentric annular race means one revoluble circumferentially of the other, an annular assembly of a plurality of load transmission rollable members between and rollably transmitting load stress between and rollable circumferentially of said race means, annular retainer means concentric of and revoluble relatively to and movable circumferentially of said revoluble race means, circumferentially spaced revoluble connections between said rollable members and said retainer means, and lubricant supply means in communication with and supplying lubricant to said connections; the combination therewith of endless lubricant circulation means common to said revoluble connections and in communication with and receiving and conducting lubricant from said supply means to and returning said lubricant from said revoluble connections, and lubricant recirculation means in communication with said endless circulation means and recirculating said lubricant therethrough.

11. In an anti-frictional bearing comprising, annular race means having spaced concentric load sustaining races flanked by a circumferentially extended sealing face, an annular assembly concentric therewith and movable concentrically and circumferentially thereof of a plurality of load transmission rollable members between and in rollable operative relation to said means, and circumferentially grooved annular retainer means concentric of and movable with said assembly and retaining said rollable members having a circumferential groove opposed to and opening toward said sealing face, and having an internal lubricant chamber in communication with said groove, and means for supplying lubricant under pressure to said chamber; the combination therewith of an annular pressure sustaining sealing means between and in leakage resistant contact with said face and said retainer means, within and closing and sustaining the pressure of said lubricant in said groove, and extended from the latter into yieldable leakage resistant contact with said face, revoluble with said retainer means, and constructed and arranged to sustain lubricant under pressure in said retainer means and yieldably resist leakage of lubricant between said face and said retainer means.

12. The bearing specified in claim 11, having said sealing means encircled by and radially inwardly closing said groove.

13. The bearing specified in claim 10, having said lubricant recirculation means in operative relation to and operated by and coincidently with rotation of said revoluble race means.

14. In an anti-frictional bearing comprising, inner and outer annular race means sustaining a load stress, an annular assembly of a plurality of load transmission rollable members between and in rollable operative relation to said means, and annular retainer means having an external circumferential peripheral groove within and encircled by said outer means; the combination therewith of an annular radially yieldable sealing means concentric with and movable concentrically and circumferentially of said race means, around and encircling said retainer means and within and encircled by said outer race means, mounted within said groove and radially yieldably extended therefrom into leakage resistant contact with and encircled by said outer race means, and constructed and arranged to radially yieldably resist leakage therebetween axially thereof.

15. The bearing specified in claim 10, having said recirculation means in operative relation to and operated by rotation of said retainer means.

16. In an anti-frictional bearing comprising, race means sustaining a load stress, an annular assembly concentric therewith of a plurality of load transmission rollable members and annular retainer means retaining said rollable members in rollable operative relation to said race means; the combination therewith of revolubly arrestable lubrication means in communication with and supplying lubricant to said bearing, revolubly connected to and revoluble with and revolubly disconnectable from and revolubly arrestable relatively to said retainer means during said rollability and non-rotary relatively to the latter during said arrest, and constructed and arranged during said arrest to non-rotatively supply lubricant to said bearing without stopping said rollability.

17. In an anti-frictional bearing comprising, concentric annular races having opposed spaced load stress sustaining peripheries, an annular assembly of a plurality of rollable members respectively having load transmission outer peripheries between said peripheries, annular retainer means retaining said rollable members in rollable operative relation to said race means, circumferentially spaced revoluble connections between said members respectively and said retainer means, and lubricant supply means common to a plurality of said revoluble connections; the combination therewith of partition means between and partitioning said lubricant supply means from said peripheries and resisting flow of lubricant to the latter.

18. In an anti-frictional bearing comprising, race means sustaining a load stress, an annular assembly of a plurality of load transmission rollable members in rollable operative relation to and rollably transmitting load stress to said race means, and annular retainer means revolubly retaining said rollable members in rollable operative relation to said race means; the combination therewith of annular lubricant supply means in communication with and supplying lubricant to said bearing, within and extended circumferentially of and revoluble with said retainer means and in communication from without to within and through the latter with and supplying lubricant to said bearing during said rollability.

19. In an anti-frictional bearing comprising, concentric annular race means having opposed spaced load stress sustaining faces and one revoluble circumferentially of the other, an annular assembly of a plurality of load transmission rollable members between said races, annular retainer means concentric of and movable circumferentially of and relatively to said races, and movable with and retaining said rollable members in rollable operative relation between said races, and lubricant supply means in communication with and supplying lubricant to said bearing; the combination therewith of revoluble lubricant feeder means in operative relation to and feeding lubricant to said supply means, in operative relation to and operated by said revoluble race and said relatively revoluble retainer means respectively, and constructed and arranged in response to and coincidently with said relative revolution of the latter to feed lubricant to said supply means during said rollability.

20. In an anti-frictional bearing comprising, inner and outer race members, one revoluble circumferentially of the other, having opposed radially spaced circumferentially extended radially resistant races, and having opposed axially spaced circumferentially extended axially resistant races radially spaced a lesser distance than said races and intersected by opposed charging notches having bottoms coinciding with said first races and having end walls radially extended beyond said bottoms, an annular assembly of a plurality of rollable members spaced circumferentially of said races and having outer peripheries insertable through said notches and fitting between and spacing said races and rollably transmitting stress between said races, and annular retainer means in operative relation to and retaining said rollable members between said race members; the combination therewith of annular sealing means between and concentric of and extended circumferentially of said race members and said retainer means and resisting leakage therebetween, disposed and radially extended beyond the bottoms of said charging notches, in leakage resistant operative relation to said race members and said retainer means beyond the bottoms of said charging notches, and constructed and arranged to beyond said bottoms resist leakage between said race members and said retainer means.

21. In an anti-frictional bearing comprising, annular race means sustaining a load stress, an annular assembly of a plurality of load transmission rollable members in rollable operative relation to said means, annular retainer means between and at the sides of and in rollable operative relation to and movable concentrically and relatively circumferentially of said race means, and revoluble connections between said rollable members and said retainer means; the combination therewith of lubricant supply and return means common to and lubricating said revoluble connections, including lubricant supply conduits extended axially between said race means and in communication from one to the other of said retainer means, and a lubricant return conduit common to and in communication with said supply conduits and with and returning said lubricant from one to the other of said retainer means, and means for circulating lubricant through said conduits.

GEORGE HOLT FRASER.